United States Patent Office 3,021,285
Patented Feb. 13, 1962

3,021,285
METHOD OF PRODUCING LUMINESCENT MATERIALS
Bennett Bovarnick, 11 Cummings Road, Boston, Mass., and Hans S. Joachim, deceased, late of 505 Ocean Ave., Boston, Mass., by Elfriede Jacobi, legal representative, Brooklyn, N.Y.; said Elfriede Jacobi assignor of one-sixth to Elfriede Jacobi, Brooklyn, N.Y., one-sixth to Gunther Joachim, Tel Aviv, Israel, one-eighteenth to Ingeborg Joachim, Berlin, Germany, one-eighteenth to Margot von Riebnits, Beirut, Lebanon, and one-eighteenth to Annemarie Joachim, Berlin, Germany
No Drawing. Filed Nov. 15, 1956, Ser. No. 622,497
Claims priority, application Great Britain Nov. 15, 1955
4 Claims. (Cl. 252—301.4)

The present invention relates to luminescent materials.

The invention relates to a novel class of materials and shows that a much greater number of materials than has heretofore been known can be formed to possess luminescent properties in various regions of the optical spectrum, so that a much greater variety of practical applications of luminescent material is possible, than has hitherto been recognized.

The expression "luminescent," as used in this specification comprehends the electromagnetic radiation from a substance due to all kinds of excitation known in the art, like electromagnetic irradiation from the shortest wave lengths up to the infrared radiation, or by particles of different energies, whether they may be electrons, protons, neutrons, etc., either from external or internal sources, whereby the imparted energy is transformed into radiating energy, especially in the visible range of the optical spectrum and the term "luminescent material" when used herein and in the claims hereof is intended to mean a material adapted to be excited by at least one such source.

It has been well known for a long time that luminescent materials can be prepared by using inorganic compounds like oxides, sulphides, silicates, etc., as basic or matrix materials with the addition of other substances, called "activators," either of an inorganic or organic nature, these additions being in more or less minute quantities. These activator substances are considered to act as centers of luminescence, and are supposed to determine the colour and other properties of the emitted visible radiation, according to their inherent nature and the method of preparation. It has been generally assumed so far, that these activators of an inorganic nature should be substances having in their ground-state electrons in the $d$-shell according to the Bohr-model of atomic structure, and that for activators of an organic nature the structure of the molecule determines the possible vibration frequency in a more complicated manner, as is well known in the art of dyes, or photographic materials, it being generally assumed that the common factor is the presence of so-called conjugate double bonds.

Furthermore, it is well known that the preparation of luminescent materials involves in most cases melting the basic materials, such as sulphides, selenides, silicates, tungstates, borates, molybdates, vanadates, etc., with the amount of activator with the help of fluxes, such as ammonium-, alkaline-, and alkaline-earth chlorides or fluorides at well defined temperatures. Extremely great care has to be taken in the preparation to ensure the purity of the matrix substances, and many complex and expensive methods have been developed to obtain the highest degree of purity thereof in starting from different raw materials.

Another way of preparing luminescent materials has been by sintering oxides or pyrophosphates or other compounds which contain metals having $d$-shells, whereby it is assumed that these metal compounds are decomposed and the metal atoms are set free at high temperatures and the necessary activator atoms formed by this partial disintegration of such compounds.

We have now found and confirmed by experiment that previous beliefs need modification. The prior practice has been based on the belief that in order to prepare luminescent materials the following conditions have to be met: (1) Either the matrix substance, or the added activating substance or both have to be restricted to substances having a $d$-shell in case of inorganic compounds, or to molecules having conjugate bonds in case of organic material. (2) The activator is commonly restricted to a minute quantity, e.g., in general the quantity which is recommended is one not exceeding 1 part per 1,000, or better 1 part per 10,000, and even 1 part per 100,000 is not uncommon. (See: "Preparation and Characteristics of Solid Luminescent Materials, Symposium held at Cornell University, October 24–26, 1946, Chapman & Hall, London, 1948," and "Luminescence With Particular Reference to Inorganic Phosphors, Symposium held by the Electronic Group of the Institute of Physics, April 1954, British Journals of Applied Physics, Supplement No. 4, 1955.")

We have now found and have proved by experiment that the restriction to an activator atom, or a matrix atom with a $d$-shell is unnecessary. For example, oxides, such as aluminium oxide ($Al_2O_3$) or boron oxide ($B_2O_3$) form a matrix which can be transformed into luminescent material by adding into the lattice structure substances of low atomic weight, such as lithium, beryllium, boron, carbon, nitrogen, oxygen, fluorine, sodium, magnesium, aluminium, silicon, phosphorus, sulphur, chlorine, potassium, and calcium which do not possess any $d$-shell, so that luminescent materials may be obtained more simply and cheaply and so that a greater variety of colour changes is made available.

Therefore, the present invention consists of impurity activated luminescent materials in which the atoms of the one or more elements constituting the activator and the atoms of the elements constituting the matrix shall all be such that when each atom is in its ground-state the electron $d$-shell according to the Bohr model of atomic structure is completely unoccupied, and therefore the present invention comprises an impurity activated luminescent material in which the atomic number of each of the one or more elements which constitute the activator and the matrix does not exceed 20. The inert gases helium, argon and neon, however, are intended to be excluded from the scope of this invention. The chosen elements may appear together or in various chemical combinations with each other. Such combinations do not interfere with their luminescent behaviour, except insofar as response to irradiation is the composite response of the individual elements combined. The activator may correspond with the basic element of the matrix, e.g., may be finely distributed aluminium in a matrix of aluminium oxide. Our invention particularly includes crystalline phosphors in which the activator consists of an element or elements as aforesaid or in which both the matrix and the activator consist of the said elements.

The method according to the invention or producing the luminescent materials consists in sintering in powder form matrix materials, especially oxides such as of aluminium ($Al_2O_3$) or boron oxide ($B_2O_3$), and distributing the additions such as boron, carbon, aluminium or any other substance of atomic number not more than 20 in powder form into the lattice of the sintered matrix by diffusion. Such diffusion takes place, as is well known in the art of diffusion, at certain elevated temperatures which are different for different substances, the time required for diffusion into the lattice or the matrix, depending on the substances to be introduced into the lattice, and on the temperature at which the process of diffusion takes place, and later herein suitable temperatures and holding times are stated.

We have obtained good results, as shown by the following examples, when the matrix is a solid oxide as aforesaid and the activator is carbon or boron.

For example we have found that an impurity-activated phosphor consisting of aluminium oxide with 3% (three percent) of carbon by weight or 3% (three percent) of boron, by weight, exhibits strong luminescence in the visible spectrum when irradiated by ultraviolet light. We have further found that with the new luminescent materials a change in the intensity and frequency of the emitted radiation and duration of afterglow can be promoted by variation of the proportion of the constituents in the material, without variation in other respects of the composition. For example, we have prepared a series of compositions of aluminium oxide with various boron additions within a range of from 1% to 6% by weight of the aluminium oxide. In a specific example, 1% of boron was used based on the $Al_2O_3$. In another example, 3% boron was used and in a third example 6% boron was used based on the $Al_2O_3$ by weight. When the boron addition was in the lower region of the range the samples responded to ultraviolet irradiation with a pale lavender colour, when the boron addition was in the intermediate part of the range an intense burgundy colour resulted and when the boron addition was in the higher part of the range a less intense rose colour resulted. Similar effects were obtained when carbon instead of boron was added to aluminium oxide. Variations of intensity and afterglow can also be controlled by adjusting the proportions and the constituents.

A notable feature of the invention is the relative ease with which the new class of luminescent materials may be prepared. In the preparation of prior known compositions, it has always been necessary to exercise extreme care to ensure that the materials being compounded were maintained in the proper ratio, lest the luminescent character of the composition be lost, either by poisoning due to an excess or starvation due to insufficiency of the activating agent in the matrix substance. The allowed variation in the required amount of the activating agent in the prior art is normally very limited. This can be readily understood, when, for example, it is appreciated that in the prior art a material may call for an addition of 0.001 percent by weight of activator and regard is had to the difficulty of controlling the accuracy required to weigh out for example a quantity equal to 0.001 percent of ten grams, if such a sample size is desired. In the case of a larger sample, for example, 0.1 gram to ten kilograms, it is readily apparent that uniform dispersion of the activator agent through the matrix is very difficult or impossible to obtain. Luminescent materials according to the present invention on the other hand can be produced without these critically sensitive problems of composition control appearing since the quantity of the activator agent may be of a higher order of magnitude in relation to the matrix substance, and hence both substances can be weighed to the desired accuracy and mixed to the optimum dispersion without difficulty.

Further in the preparation of luminescent material according to the invention the use of fluxes can be avoided if desired. Thus undesirable interaction between an undesirable fluxing agent and a wanted substance can be avoided. Because fluxing can be dispensed with desired compositions can be prepared with greater ease and at less cost.

It will be appreciated that the diffusion which is essential for the transfer of the activator element into the lattice of the matrix crystals will take place at accelerated rates at elevated temperatures. In order to accomplish a given extent of diffusion, it is necessary to hold the material for a characteristic time which is dependent on the firing temperature. The integral of the time-temperature curve is a measure of the energy which is required to accomplish the desired extent of diffusion. This same diffusion can be accomplished with other time-temperature combinations, provided the total energy input is the same. Mechanical energy may be applied prior to the firing operation to compress the powders and to form briquets, the retained energy in forming being available to aid in diffusion. The application of mechanical load assists the diffusion process by the generation of dislocations and other irregularities in the lattice of the crystals of the matrix, the presence of dislocations assisting in the diffusion process by providing paths for the activator atoms to follow. These features are special effects gained in the forming of the briquet in the pressing operation.

According to one specific example, we prepared a luminescent plate with an aluminium oxide ($Al_2O_3$) matrix and an activator of carbon, the aluminium oxide chosen being of the highest purity commercially available. The oxide material is used in the powdered state and is mixed with 3% of pure carbon powder by weight of the matrix material, viz., mixing being as thorough as possible and effected by means of tumbling in a porcelain jar with ceramic pebbles for four hours. The mixed powder is then pressed into a plate of the desired size and shape by means of a die, for example, so that the material will always keep its form and is not fragile or easily deformable. A pressure of 40,000 pounds per square inch has been found satisfactory. A pressure of above 15,000 pounds per square inch is in general advisable. The so prepared material is then heated to a temperature between 1,500 and 1,950 degrees centigrade, preferably 1700° C., and kept at this temperature for four hours. The time and temperature are dependent upon the specific characteristics of the components of the mixture to be sintered, and the properties desired in the final product, the temperature generally being within the aforesaid limits and the time varying from ten minutes to eight hours.

The inert atmosphere which is used is selected so that it expedites sintering process. As an example sub-atmospheric pressure leads to decomposition of the matrix compounds in a slight degree which results in excited molecules for sintering.

After cooling the material will then show luminescence, when excited, for example, with ultraviolet light of 2350 A., of a reddish colour and have a bright afterglow. When excited with 3650 A. the colour will be somewhat darker. If instead of carbon a similar amount of boron is added, prepared otherwise under the same conditions, an intense burgundy coloured luminescent light will result.

Among the major applications for the material of the invention are as wall coating (1) in the form of tiles or blocks similar to porcelain tiles used directly as the product of the sintering step (or after slight finishing mechanically to final dimension), the blocks or tiles then being installed onto the surface of interest; and (2) in the form of a powder prepared by pulverization of the blocks or plates after they had been sintered. The powder is admixed with a paint or similar vehicle in a fashion similar to the employment of aluminium or brass flake powder as a paint pigment, the paint then being applied to the surface or area of interest in the normal manner for such paints.

Another suitable matrix material which we have found to give good results and to be responsive to the herein described method of preparation is boron oxide ($B_2O_3$). Activators of carbon and boron for example can be in this way incorporated in the lattice structure thereof.

The manufacture of solid bodies of high melting oxides or other ceramic materials, as it is done in the current practice, generally requires the presence of a bonding phase of clay or glass to be mixed with the basic ceramic material. As a result of the firing step, the clay or glass fuses and holds the remainder of the constituents of the solid as an internal adhesive or cement, whereas in the process envisaged herein such additional material phase need not be present especially where a carbon or boron activator is employed, although such a phase may be used, if desired in certain applications.

It is to be recognized that the relative simplicity of this new class of luminescent materials, the ease of the control required for their preparation and the low costs of the ingredients make possible the very economical use and application of these luminous materials leading to increased and expanded utilization of luminescent materials where it has hitherto been considered impractical. It is envisaged that uniform, glarefree, shadowless interior lighting e.g., in the home, can become a reality by having, for example, walls coated with the new compositions and that these materials will find immediate applications as illuminators in public corridors, as domestic night-lights, in advertising displays, and in various other domestic and industrial applications.

We claim:

1. A method of preparing a luminescent material comprising thoroughly mixing powdered $Al_2O_3$ with 3% by weight of powdered carbon, pressing the mixture at a pressure of 40,000 lbs. per square inch, then heating the pressed mixture at a temperature of 1700° C. for 4 hours to sinter the same and to diffuse the carbon into the $Al_2O_3$ crystal lattice.

2. A method of preparing a luminescent material comprising thoroughly mixing powdered $Al_2O_3$ with 3% by weight of powdered boron, pressing the mixture at a pressure of 40,000 lbs. per square inch, then heating the pressed mixture at a temperature of 1700° C. for 4 hours to sinter the same and to diffuse the boron into the $Al_2O_3$ crystal lattice.

3. A method of preparing a luminescent material comprising thoroughly mixing powdered $B_2O_3$ with 3% by weight of powdered carbon, pressing the mixture at a pressure of 40,000 lbs. per square inch, then heating the pressed mixture at a temperature of 1700° C. for 4 hours to sinter the same and to diffuse the carbon into the $B_2O_3$ crystal lattice.

4. A method of preparing a luminescent material comprising thoroughly mixing powdered $B_2O_3$ with 3% by weight of powdered boron, pressing the mixture at a pressure of 40,000 lbs. per square inch, then heating the pressed mixture at a temperature of 1700° C. for 4 hours to sinter the same and to diffuse the boron into the $B_2O_3$ crystal lattice.

References Cited in the file of this patent

UNITED STATES PATENTS

| | | |
|---|---|---|
| 2,224,516 | Kerstan | Dec. 10, 1940 |
| 2,312,266 | Roberts | Feb. 23, 1943 |
| 2,451,292 | Leverenz | Oct. 12, 1948 |
| 2,505,621 | Leverenz | Apr. 25, 1950 |
| 2,752,521 | Ivey | June 26, 1956 |

OTHER REFERENCES

Leverenz: "Luminescence of Solids," J. Wiley & Sons, New York, N.Y. (1950), pages 539, 99, 222, 226, 402, 76–80.

Kroger: "Luminescence of Solids" (1948), p. 265.

Kroger: "Some Aspects of the Luminescence of Solids," 1948, p. 278.

Leverenz: "Luminescence of Solids," 1950, pages 79 and 539.